UNITED STATES PATENT OFFICE.

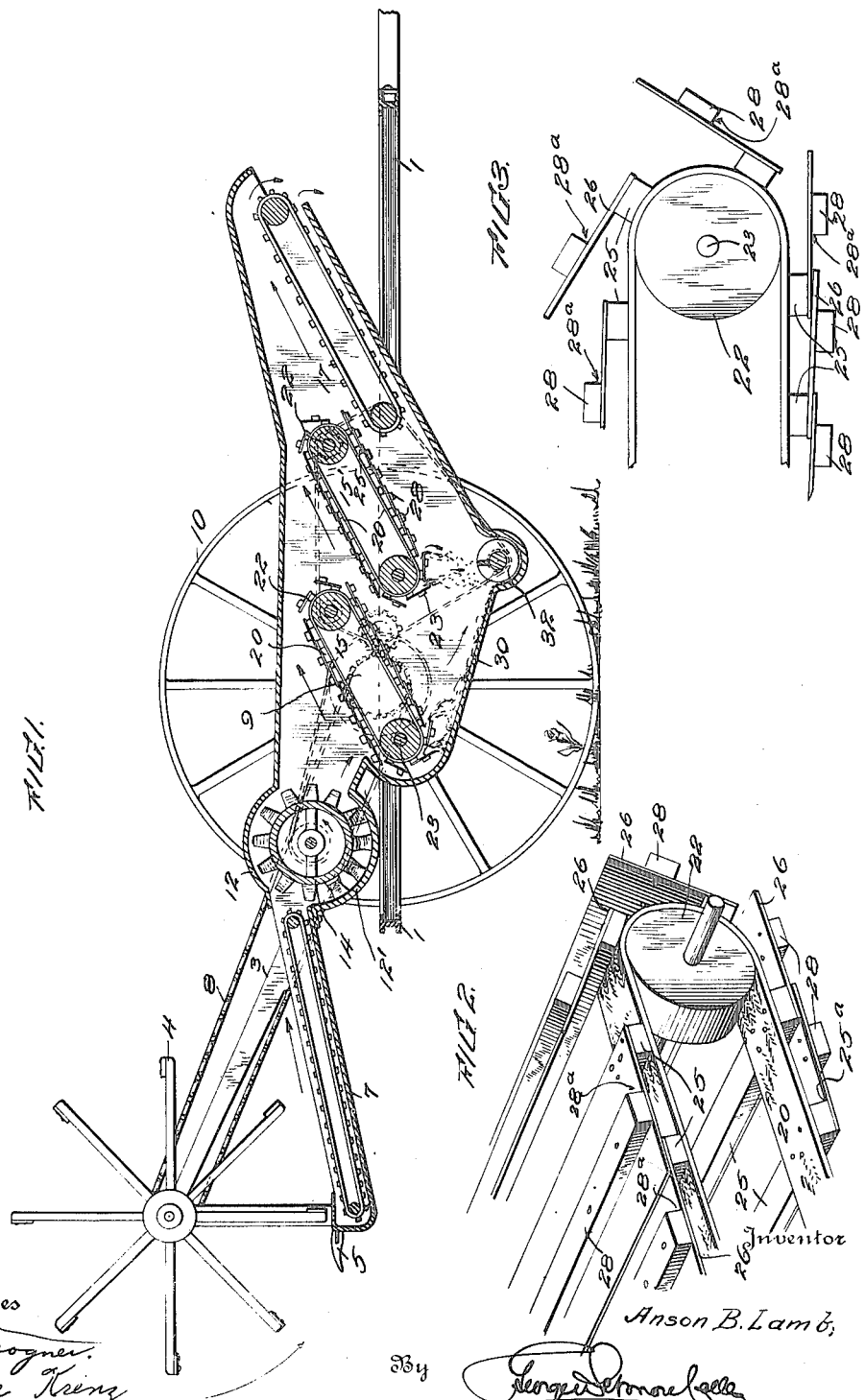

ANSON B. LAMB, OF NATIONAL HOME, WISCONSIN.

SEPARATOR FOR THRESHING-MACHINES.

1,181,018. Specification of Letters Patent. Patented Apr. 25, 1916.

Application filed August 6, 1914. Serial No. 855,446.

*To all whom it may concern:*

Be it known that I, ANSON B. LAMB, a citizen of the United States, residing at National Home, in the county of Milwaukee and State of Wisconsin, have invented certain new and useful Improvements in Separators for Threshing-Machines, of which the following is a specification.

This invention relates to threshing machines and particularly to the mechanism for separating the grain from the straw and chaff after it has passed through the threshing cylinder.

The main purpose of my invention is to provide an efficient separator mechanism which receives the threshed grain, chaff and straw from the cylinder and thoroughly separates the grain therefrom, transferring the straw and chaff to the straw carrier or conveyer.

In the accompanying drawings which illustrate my invention and show its relation to the other parts of a threshing machine, Figure 1 is a longitudinal sectional view through the threshing machine; Fig. 2 is an enlarged perspective view of a portion of the grain separator; and Fig. 3 is an enlarged view of one end of the separator.

My separator is shown in connection with one form of cutting and threshing mechanism which is illustrated in conventional manner and will be understood by those familiar with harvesting machines.

To the main platform 1 of the threshing machine is pivoted a frame 3, which carries the reel 4, cutter bar 5 and conveyer apron 7, to which motion is applied through the belt or chain 8, connecting with a gear 9 on the traction wheel 10. The cut grain passing from the cutter bar 5, upon the traveling apron 7, is conveyed to the cylinder housing formed by the concave 12, 12' where it is beaten and threshed by the teeth or spokes of the threshing-cylinder 14.

The mixed grain and straw are delivered by the threshing cylinder to the separators 15, 15' which act successively to completely separate the grain, and transfer the straw to the straw carrier or conveyer 17, from which it is discharged at the upper end in the usual manner.

As previously stated, the purpose of my invention is to provide simple and efficient mechanism for completely separating the grain from the straw. These separators comprise parallel belts or bands 20, which pass over pulleys or rollers 22, 23, at their opposite ends and form the supporting and driving means for the outer parts of the mechanism. The belts are connected by slats 25, riveted or otherwise rigidly fastened thereto and spaced at equal distances. Secured rigidly to the outer side of each slat is a plate 26, of a width sufficient to overlap the adjacent edge of the succeeding plate and to the center of which is fastened a dividing bar or cleat 28. It will be observed the series of overlapping plates 26, forms a continuous unbroken traveling apron or carrier between the pulleys 22, and 23, both upon the upper and the lower sides and that the cleats 28 divide the upper surface transversely into a plurality of recesses or pockets, while the same function is performed by the slats 25, upon the inner upper surface of the apron formed by the overlapping plates on the under side.

In operation, the separator belts 20, are given a continuous motion in the direction of the arrows by suitable chain and sprocket connections in the usual manner, as I have illustrated. As the threshed grain and straw are delivered to the separator 15, by the threshing cylinder, the lifting and conveying motion of the separator causes the grain to gravitate or sift through the straw, falling upon the plates and being held in the pockets 28$^a$ between upper edges of the cleats and the plates. As each slat 25 reaches the upper end of its travel and begins to curve downward around the periphery of the pulley 22, the attached plate is tilted and the loose intertwined straw is thrown forward upon the second separator 15', but as the heavier grain rolls and slides from the plate it is caught by the upturned under side of the next plate ahead which has passed the vertical and has turned over into a reversed angular position. The grain is thereby guided down upon the inner upper side of plates forming the bottom apron and is retained successively by the pockets 25$^a$ formed by the upper edge of the slats 25 and the plates. In this manner the separated grain is carried back to the lower end of the separator and as the slats 25 begin to pass around the pulley or roller 23, the plates 26, tilt downward, permitting the grain to fall into a pan or other receptacle 30, from which it may be carried by a worm conveyer 32, to the cleaning and bagging mechanism. It will be observed that the plates are secured at the forward edge to the slats 25, so that during the tilting movement in passing over the pulley 22, the rear or lower part of the plate is caused to swing through a long arc which will give a strong forward impetus to the straw which is discharged over the upper end of the separator.

While a single grain separator will free nearly all of the grain from the straw, yet to insure the complete separation, I may employ a second separator 15' which is similar to the first one, receiving the straw therefrom and discharging it upon the straw carrier 17. By using two separators in succession, I am enabled to effect a thorough separation of the grain. When the threshed grain passes from the cylinder to a rattler rake with open slats as in ordinary threshing machines, a much larger proportion of chaff and extraneous matter passes along with the grain than is the case when my separator is employed which is an important feature. Other advantages will be apparent to those familiar with harvesting machinery.

I have described in detail the particular construction illustrated in the drawings for the purpose of disclosing an embodiment of my invention but I am aware that various changes may be made therein without departing from the scope of my claims or from the spirit of my invention. I have illustrated my separator in connection with a header-machine, but it will be understood that it is intended as well to be used in threshing machines.

I claim:—

1. A grain separator having a traveling apron or carrier, comprising a continuous traveling belt and a series of separately mounted overlapping plates rigidly attached thereto.

2. A grain separator comprising a continuous traveling belt, slats or bars rigidly secured transversely thereto, and plates rigidly attached to said slats, having adjacent edges overlap to form a continuous top surface.

3. A grain separator comprising a continuous traveling belt, slats or bars rigidly secured transversely thereto, plates rigidly attached to said slats, having adjacent edges overlap to form a continuous top surface, and transversely extending cleats secured in spaced relation to said plates.

4. A grain separator comprising a continuous traveling belt, slats or bars rigidly secured transversely thereto and plates rigidly secured to said slats, at their forward edges, having adjacent edges meet to form a continuous top surface.

5. A grain separator comprising parallel continuous traveling belts, slats spaced apart and rigidly connected to said belts, and plates rigidly attached to the outer sides of said slats, having overlapping adjacent edges.

6. A grain separator comprising parallel continuous traveling belts, slats rigidly connected to said belts and spaced apart at equal distances, plates rigidly secured to said slats, having overlapping adjacent edges, and cleats secured to said plates and spaced at equal distances from each other.

7. A grain separator comprising parallel rollers or pulleys, arranged at different elevations, continuous belts extending over and traveling upon said rollers, slats extending transversely between said belts and rigidly attached thereto, and plates rigidly attached to said slats, said plates extending in a continuous overlapping series between the rollers and separating from each other during their passage around the rollers.

8. A grain separator comprising parallel rollers or pulleys arranged at different elevations continuous belts extending over and traveling upon said rollers, slats extending transversely between said belts and rigidly secured thereto, plates rigidly attached to said slats, said plates extending in a continuous overlapping series between the rollers and separating from each other during their passage around the rollers, and cleats carried upon the outer sides of said plates.

9. A grain separator comprising parallel rollers or pulleys arranged at different elevations continuous belts extending over and traveling upon said rollers, slats extending transversely between said belts and rigidly secured thereto, and spaced at equal distances, plates rigidly attached to said slats, said plates extending in a continuous overlapping series between the rollers and separating from each other during their passage around the rollers, and cleats centrally disposed upon the outer sides of said plates.

In witness whereof, I have hereunto set my hand in the presence of two witnesses.

ANSON B. LAMB.

Witnesses:
GEORGE WETMORE COLLES,
JOHN T. KELLY.